United States Patent [19]

Betensky

[11] Patent Number: 5,677,797
[45] Date of Patent: Oct. 14, 1997

[54] METHOD FOR CORRECTING FIELD CURVATURE

[75] Inventor: Ellis I. Betensky, Redding, Conn.

[73] Assignee: U.S. Precision Lens Inc., Cincinnati, Ohio

[21] Appl. No.: 192,328

[22] Filed: Feb. 4, 1994

[51] Int. Cl.⁶ .................................. G02B 3/02; G02B 9/00
[52] U.S. Cl. ......................... 359/708; 359/362; 359/648
[58] Field of Search ................................. 359/362–363, 359/422–435, 708, 642, 900, 662, 648–651

[56] References Cited

U.S. PATENT DOCUMENTS

| | | | |
|---|---|---|---|
| 4,545,652 | 10/1985 | Hoogland | 359/435 |
| 4,929,071 | 5/1990 | Mercado | 359/648 |
| 5,125,064 | 6/1992 | Naselli et al. | 359/648 |

*Primary Examiner*—Thong Nguyen
*Attorney, Agent, or Firm*—Maurice M. Klee

[57] ABSTRACT

A method for producing a lens system is provided in which an exact field curvature (EFC) value is determined for at least one principal ray, the EFC value being given by:

$$EFC = -\Sigma(n'-n)c/nn'$$

the summation being taken over the surfaces of the system, and for each of the surfaces, n is the index of refraction on the object side of the surface, n' is the index of refraction on the image side of the surface, and c is the curvature of the surface at the intersection of the surface with the principal ray, c being positive if the center of curvature is on the image side of the surface.

6 Claims, 4 Drawing Sheets

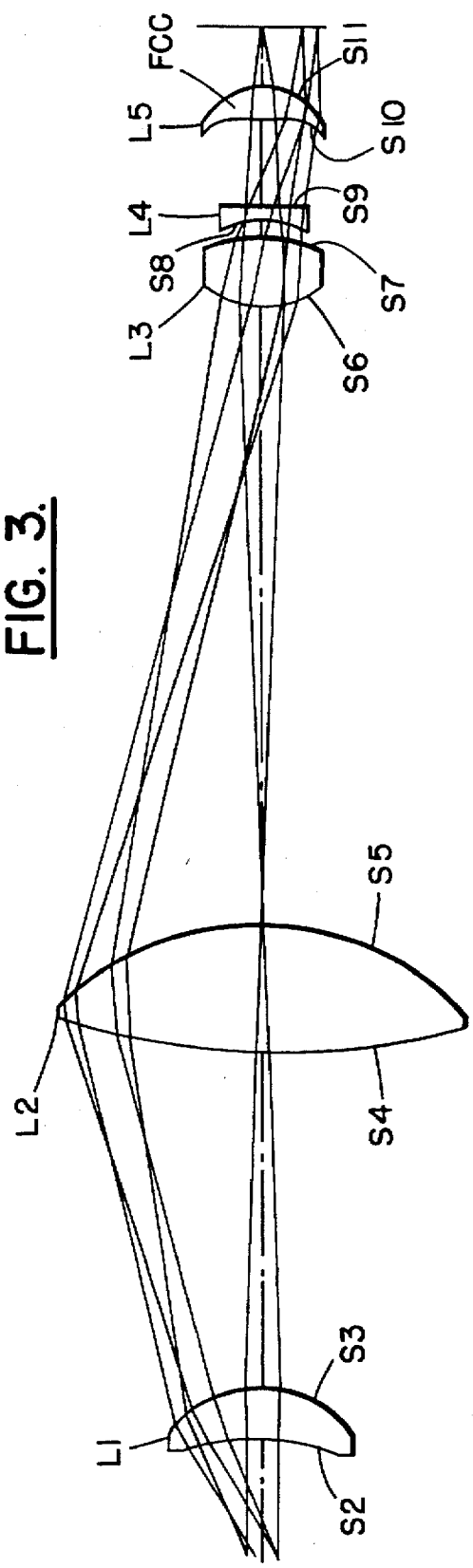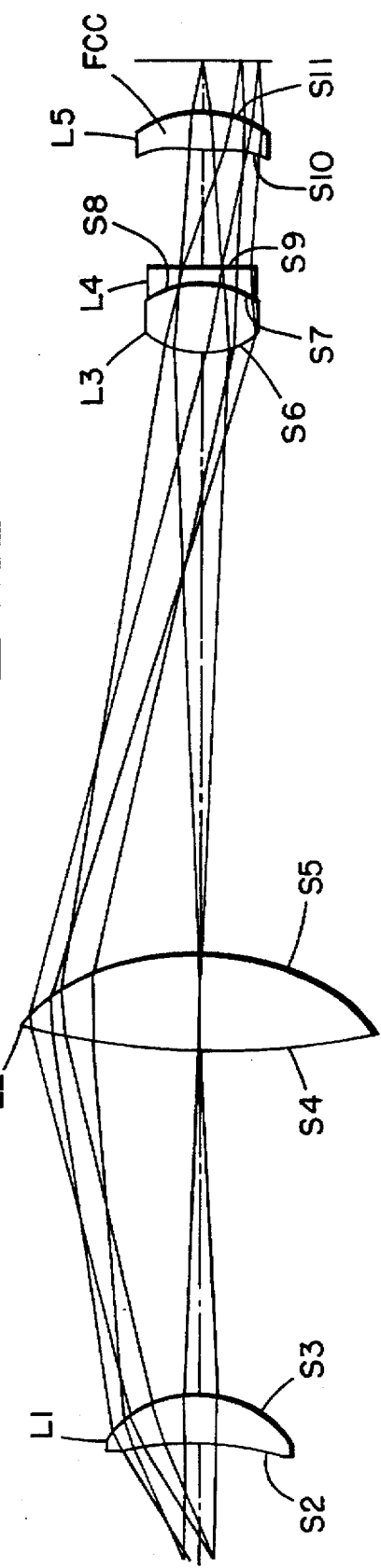

METHOD FOR CORRECTING FIELD CURVATURE

FIELD OF THE INVENTION

This invention relates to a new approach for correcting field curvature and to the application of this approach to a variety of optical systems, including, in particular, wide field of view magnifying systems which are capable of achieving an apparent total field of view of at least 60°, e.g., viewers, magnifiers, loupes, and the like.

BACKGROUND OF THE INVENTION

I. Field Curvature

A fundamental problem of optics is the formation of images which are relatively flat. Substantial flatness is desired whether an image is to be recorded or viewed. In the case of recording, flatness is desired since most recording media are flat. In the case of an image which is to be viewed on a screen, flatness is desired since most screens are flat. In the case of an image which is to be directly viewed by the eye, flatness is desired so that the eye does not have to change its accommodation when scanning various parts of an image.

To a first approximation, the shape of the image produced by a lens system can be expressed in terms of the system's Petzval curvature (PC) given by:

$$PC = -\Sigma(n'-n)c_b/nn' \quad (1)$$

where the summation is taken over all surfaces within the system and for each surface, n is the index of refraction on the object side of the surface, n' is the index of refraction on the image side of the surface, and $c_b$ is the base curvature of the surface, $c_b$ being positive if the center of curvature is on the image side of the surface. In the case of a single lens element, PC is negative if the element is positive, and PC is positive if the element is negative.

In the past, three basic techniques have been employed to produce flat images for positive lens systems or for positive lens units within a lens system where field curvature control on unit-by-unit basis is desired:

(1) the use of matched pairs of surface radii, with element thicknesses being used to achieve a net positive optical power;

(2) the use of separated negative and positive surface powers so that paraxial rays strike the surfaces with negative powers at lower heights than the heights at which they strike surfaces with positive powers, e.g., the use of a separated field flattener having a negative power; and (3) the use of combinations of positive and negative lens elements, where the positive elements have higher indices of refraction than the negative elements.

Combinations of these techniques have also been used.

In the case of a negative lens system or a negative lens unit, only two approaches have been known, namely, the use of a positive field flattener, which is only applicable where a short image distance is permissible, and the use of combinations of positive and negative lens elements, where the negative elements have higher indices of refraction than the positive elements, i.e., the last of the three approaches available for positive lens systems with the indices reversed.

These approaches to achieving relatively flat images have often suffered from problems of increased complexity and cost of the overall lens system. Complexity is often increased because as elements are added, e.g., a field flattener, additional compensating elements also must often be added to achieve the desired total power of the system. Moreover, as these additional elements are added, aberration correction becomes more difficult, which, in turn, may lead to more complexity. Cost is often increased due to increased complexity and because more expensive materials are used to obtain the required indices of refraction.

In some cases, a field flattener can be used without adding additional compensating elements, e.g., when the field flattener is near to the image or object plane. However, this approach is not usually viable when there are exit pupil position requirements at the image plane, e.g., in the case of an intermediate image or a telecentric image or object.

Notwithstanding these well-known drawbacks, prior to the present invention, only the foregoing approaches were know for controlling field curvature.

II. Magnifiers

Magnifiers comprise one of the most widely used and most basic optical systems known in the art. In addition to their numerous historical uses, magnifiers have recently become of central importance in the development of virtual reality (VR) viewing systems. Accordingly, the present invention is illustrated by means of magnifier systems and, in particular, magnifier systems suitable for use in forming virtual reality images, it being understood that the use of these systems for purposes of illustration is not in anyway intended to limit the scope of the invention.

Field curvature is of particular importance in VR viewing systems because such systems are generally designed to provide a wide field of view which the user is expected to view over an extended period of time. Accordingly, a magnifier with substantial field curvature is not suitable for such a system since the user's eyes are likely to tire rapidly if substantial reaccommodation is needed to view different parts of the VR image.

In its most simple form, a magnifier can be a single positive element with an external stop coincident with the position of the observer's eye. In this form, magnifiers can achieve magnifications on the order of 2× to 4× and can provide a small field of view over which the image quality is acceptable.

For more critical applications, such as, the detailed visual inspection of a small object or the viewing of an imaging display (e.g., an electroluminescent, CRT, or LCD display), a color correcting doublet may be added. Large negative Petzval curvature and lateral color, however, still remain, thus limiting the total field over which a reasonably high image quality can be achieved to about 40°.

Historically, correction of the Petzval curvature of a magnifier has typically involved the addition of a negative element, i.e., approach (2) above. However, as discussed above, adding a negative element requires the addition of more positive power, leading to a more complicated system. As a result, when a magnifier having a larger field of view and/or a better image quality is required, e.g., a microfiche loupe, the number of elements is often 5 or 6, and, even then, field curvature and lateral color cause the image to degrade at full field.

Betensky, U.S. Pat. No. 4,094,585, and Loy, U.S. Pat. No. 4,679,912, disclose lens systems designed to provide a wide field of view without the use of a large number of lens elements. In practice, the systems of these patents turn out to be difficult to manufacture.

Thus, the Betensky patent discloses a three element form consisting of a single positive element and a cemented doublet concave to the object. Field curvature is corrected by incorporating a strong negative element in the doublet which makes a positive contribution to the Petzval sum and by having the doublet be in the form of a thick meniscus lens concave to the object. Lateral color is corrected by having a very strong interface between the positive and the negative elements of the doublet. The doublet includes either an aspherical interface or aspherical outer surfaces.

In practice, the problem of cementing together two pieces of plastic material with high thermal expansion coefficients without generating large residual internal stresses has prevented this design from becoming a commonly used one.

The Loy patent provides a flat field by first imaging the object onto a curved surface concave to the viewer by means of a fiber optics image guide. This approach allows for fewer lens elements, but the fiber optics device which it requires is expensive, and the use of such devices in large commercial volumes is not feasible with present technology.

SUMMARY OF THE INVENTION

In view of the foregoing, it is an object of the present invention to provide a new approach for correcting field curvature.

It is a specific object of the invention to apply the new approach in the area of magnifiers, including wide field of view microscopes, and, in particular, to magnifiers for use in VR systems. In connection with these applications, it is an object of the invention to provide magnifiers which have at least some and preferably all of the following properties:

(1) a large eye relief distance, e.g., about 20 mm, to allow for comfortable viewing by people with various facial characteristics and, also, those wearing glasses;

(2) a large exit pupil/aperture stop diameter to allow for viewing in low light situations;

(3) a large apparent total field of view, preferably 60° or larger, especially in the case of VR applications;

(4) a good correction of distortion and a high image quality across the system's field of view; and (5) a field curvature correction which substantially eliminates the need for reaccommodation as the user's eye scans across the image.

To achieve the foregoing and other objects, instead of addressing the field curvature problem in terms of Petzval curvature, the invention addresses the problem in terms of the "exact field curvature" (EFC) of the overall lens system, or of individual units or subunits thereof, or of individual elements thereof, where EFC is given by:

$$EFC = -\Sigma(n'-n)c/nn' \quad (2)$$

the summation being taken over all surfaces of the system, unit, subunit, or element, as the case may be, and for each of the surfaces, n is the index of refraction on the object side of the surface, n' is the index of refraction on the image side of the surface, and c is the curvature of the surface at the intersection of the surface with a principal (chief) ray of the system, c being positive if the center of curvature is on the image side of the surface. It should be noted that in the limit of small field heights, the value of EFC given by equation (2) approaches the value of PC given by equation (1). Also for a spherical surface, EFC equals PC.

In cases where the index of refraction varies with position within an optical element, e.g., in the case where gradient index of refraction materials are used, the values of n and/or n' used in calculating EFC are those at the location of the intersection of the principal ray with the optical surface.

Alternatively, an effective value of n and/or n' can be calculated by computing an average index of refraction along the principal ray as it traverses through the material having the varying index of refraction. The average value so computed would then be used in equation (2).

In certain aspects of the invention, lens systems are designed and built in accordance with EFC values determined from equation (2). In particular, systems are produced by:

(a) designing the system by selecting the shape of one or more aspherical surfaces in the system by determining an EFC value for the system for at least one principal ray, e.g., by using the EFC parameter or an equivalent parameter (see below) as a criterium for obtaining an appropriate shape for an aspherical surface; and (b) producing the lens system designed in step (a).

Preferably, EFC values are determined for a number of principal rays and, in particular, for principal rays corresponding to large relative field heights, including the limiting principal ray of the system, i.e., the principal ray corresponding to the system's full field for which the relative field height is 1.0.

In this way, the field curvature of the overall lens system can be controlled since each EFC value provides a local measure of the field curvature of the image for the principal ray for which the EFC value is calculated. By selecting the shape of one or more aspherical surfaces in the system based on one or more EFC values, the local field curvature can be controlled. This is a fundamental distinction of the invention from the classical PC approach, since the PC approach deals with field curvature on a global, not a local basis.

A surprising result of dealing with field curvature on a local rather than a global basis is the finding in accordance with the invention that field curvature for a positive lens system, e.g., a magnifier system, can be controlled, i.e., a flatter field can be achieved, through the use of a lens element or, more generally, a lens unit or subunit, having an on-axis positive power and at least one aspheric surface which gives the element, unit, or subunit a positive EFC value for one or more principal rays, e.g., the limiting principal ray. An element, unit, or subunit having these properties, i.e., a positive power and at least one aspheric surface which produces a positive EFC value for at least one principal ray, will be referred to herein as a "field curvature corrector" or a "FCC". Multiple FCCs can be used in the practice of the invention if desired.

In accordance with classical thinking, an element, unit, or subunit having a positive on-axis power would not be considered for field curvature correction of a positive lens system since it would make the Petzval sum for the system, as given by equation (1) above, more negative, i.e., it would appear to make the field curvature worse, not better. Yet, in accordance with the invention, it has been found that postive elements, units, and subunits can be used for field curvature correction in positive lens systems provided that they make a positive EFC contribution. That is, it is EFC values which matter in terms of the flatness of the image observed by the user, not the PC value.

Based on this finding, the invention, in accordance with certain of its aspects, provides positive lens systems which include a FCC and are free of: (i) lens elements having a negative power which provide substantial correction of the field curvature of the lens system, and/or (ii) lens elements having a negative power, other than lens elements having a negative power which are associated with a color correcting doublet.

The FCC (or the FCCs where multiple correctors are used) is preferably located at a substantial distance from the aperture stop of the optical system so that the principal rays for various field heights will pass through different portions of the FCC's one or more aspherical surfaces (by definition, all of the principal rays pass through the center of the aperture stop). In addition to facilitating the correction of field curvature, this location of the FCC also minimizes the effects of the FCC on aperture dependent aberrations, which tend to be increased by the FCC as the FCC moves towards the stop.

In particular, the FCC is preferably located at a point where for all optical surfaces of the FCC, $\overline{Y}/Y$ is greater than about 1.0, more preferably greater than about 2.0, and most preferably greater than about 3.0, where $\overline{Y}$ is the height of the limiting principal ray at the optical surface and $Y$ is the height of the axial marginal ray at the surface.

To minimize the physical size of the lens element or elements used in constructing the FCC, the FCC is preferably on the side of the aperture stop which is associated with the smaller of the object and the image. For example, in the case of a magnifier, the FCC is preferably at the object end of the lens system.

The FCC should have positive EFC values for the principal rays which correspond to larger relative field heights, including the system's limiting principal ray. For example, the FCCs preferably have positive EFC values for principal rays corresponding to relative field heights of 0.8 and above. Looked at another way, the EFC values for the FCC are preferably positive for at least the principal rays which are in the region of the FCC's clear aperture. Looked at still another way, the EFC values are positive for principal rays whose heights at the optical surfaces of the FCC are greater than about 2.5 times the heights of the axial marginal ray at those surfaces.

A particularly preferred application of the FCCs of the invention is in the area of magnifiers and, in particular, compounded magnifiers. In accordance with these aspects of the invention, an optical system for forming an image of an object is provided which comprises:

a positive objective lens unit (first lens unit) which forms an intermediate image of the object, has an exit pupil, and includes at least one power element and at least one FCC; and an eyepiece lens unit (second lens unit) which reimages the intermediate image to form the image of the object, said unit having an entrance pupil.

For many applications, the optical system will also include a field lens unit (pupil imaging unit) located in the vicinity of the intermediate image which images the exit pupil of the objective lens unit into the vicinity of the entrance pupil of the eyepiece lens unit.

The use of a FCC in systems of this type overcomes the drawbacks of previously proposed configurations for providing high quality magnification with a limited number of elements, e.g., the Betensky and Loy designs discussed above. In particular, the magnifiers of the invention achieve a flat field and a high image quality over a large field of view. Additional benefits achieved by these magnifiers include a large entrance pupil diameter, low cost, and flexibility in configuring the system to meet the requirements of various applications.

BRIEF DESCRIPTION OF THE DRAWINGS

FIGS. 1 through 6 are schematic side views of lens systems constructed in accordance with the invention.

Figure 1:
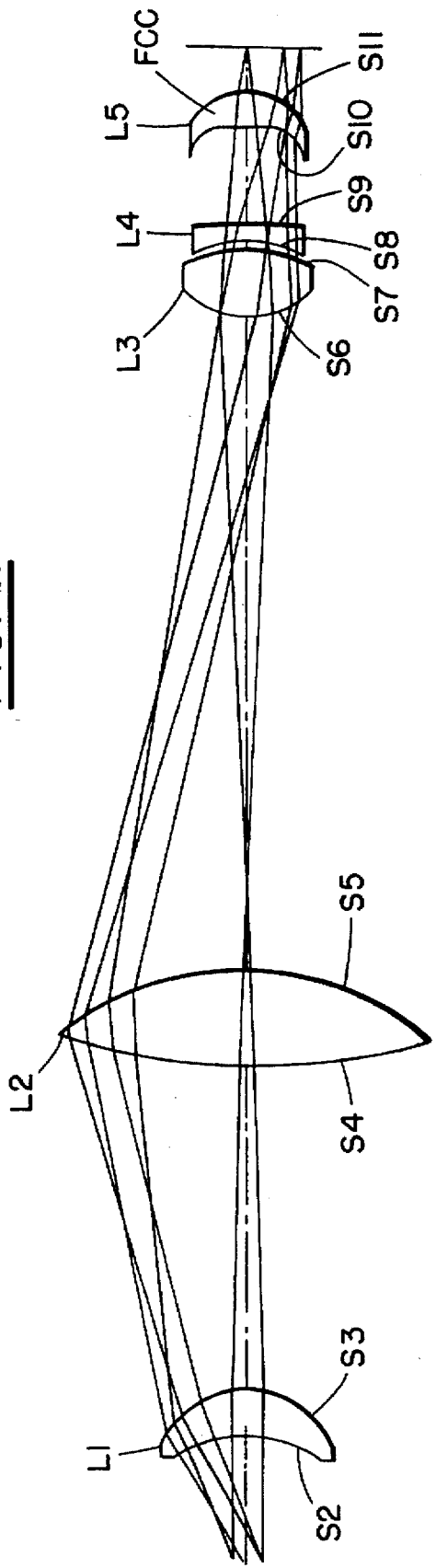

These drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

As discussed above, the present invention relates to the reduction of field curvature through the use of a novel field curvature corrector which has a positive power, where the power is calculated using the base radii of the corrector. In this way, the corrector provides a reduction in field curvature without the introduction of a strong negative element into the system, which would have to be compensated for by other elements in the system, both in terms of its first order properties, e.g., power and pupil imaging, and its aberrations.

As also discussed above, a preferred application of the corrector is in the construction of magnifiers and, in particular, compounded magnifiers. As known in the art, compounded magnifiers generally comprise an objective lens unit and an eyepiece lens unit which are separated from each other by a relatively large space where an intermediate image is formed. Often, a positive field lens unit is provided in the vicinity of the intermediate image to assure that the light originating at the object ends up going through the observer's eye.

Ordinarily, in systems of this type both the objective and the eyepiece lens units are corrected to a best possible degree for various aberrations including field curvature and lateral color. Often these systems have reticles and/or other accessories placed in the intermediate image plane or use a ground glass screen in that location. When this is done, the intermediate image generally needs to exhibit good image quality. For these configurations, if FCCs are used, they would be used on a unit-by-unit basis, e.g., to correct the field curvature of the objective lens unit.

If the system requirements do not call for reticles or similar devices at the intermediate image, i.e., if the system allows for an aerial intermediate image, then the objective or the eyepiece lens unit can be designed to have a strongly overcorrected field and the other unit can then have a relatively simple configuration. In particular, if a FCC is used at the object end of the lens system, an intermediate image with strongly overcorrected field curvature which matches the field curvature of the eyepiece can be produced. As a result, a very simple eyepiece can be used.

In the limiting case, as illustrated by the examples presented below, the eyepiece can be a single element. When this is done, the objective lens unit needs to supply an appropriate amount of lateral color of opposite sign to the lateral color of the single element eyepiece.

The remaining aberrations of the magnifier, e.g., spherical, astigmatism, coma and distortion, are controlled through the use of aspherical surfaces in the objective, field, and/or eyepiece units of the magnifier. Axial color can be conveniently corrected by the use of one or more color-correcting doublets in the objective unit.

The field unit of the magnifier can comprise conventional lens elements or a Fresnel lens as illustrated in Example 2. If the optical system must fit into a small package, e.g., a helmet in the case of a VR system, the light path may be folded using mirrors or prisms.

The field lens unit can be eliminated by providing an appropriate optical power in the folding mirrors. In that case, a positive Petzval sum contribution from the mirrors will help in correcting field curvature. The mirrors can be regular curved reflectors or Fresnel reflectors, and can have an aspherical shape and a decentered location relative to the optical axis of the system.

The EFC parameter discussed above provides an effective approach for directly reducing and/or correcting the field curvature of a lens system independent of its astigmatism. A suitable approach for employing this parameter is to include it, along with other parameters, e.g., parameters representing the first and third order properties of the lens system, in a figure of merit determination employed in a computerized optical design program. It should be noted that the EFC parameter or an equivalent thereof, e.g., the S4X parameter discussed below, can be used in the design of both positive and negative lens systems.

A variety of commercially available lens design computer programs can be employed in the practice of these aspects of the invention, e.g., the program sold by Optical Research Associates, Pasadena, Calif., under the trademark CODE V. Non-commercially available systems, of course, can also be used.

Lens systems designed in accordance with the EFC approach can be produced using a variety of lens fabrication and assembly procedures well known in the art. The invention, of course, can also be practiced using fabrication and assembly procedures which may be developed in the future. General discussions of applicable manufacturing techniques can be found in, for example, *The Handbook of Plastic Optics*, 2nd edition, U.S. Precision Lens Inc., Cincinnati, Ohio, 1983, and Horne, Douglas F., *Optical Production Technology*, 2nd ed., Adam Hilger, Ltd., Bristol, 1983, the relevant portions of which are incorporated herein by reference.

EXAMPLES

Without intending to limit it in any manner, the present invention is illustrated by the examples of FIGS. 1–6 and the corresponding prescriptions of Tables 1–6. Surfaces and lens elements are identified by "S" and "L" numbers, respectively, in the figures.

As is conventional, the figures are drawn with the long conjugate on the left and the short conjugate on the right. In use, the object to be viewed will be on the right and the observer's eye will be on the left. References to the image and the object are based on this "in use" configuration.

The index of refraction and the Abbe number for the acrylic and styrene materials referred to in the tables are as follows: ACRYLIC—$N_e$=1.493538, $V_e$=57.3; STYRENE—$N_e$=1.594948, $V_e$=30.7. The designation 491570 in Table 2 refers to a material having $N_e$=1.491 and $V_e$=57.0, while the designation 595308 refers to a material having $N_e$=1.595 and $V_e$=30.8.

The aspheric coefficients set forth in the tables are for use in the following equation:

$$z = \frac{cy^2}{1+[1-(1-k)c^2y^2]^{1/2}} + ADy^4 + AEy^6 + AFy^8 + AGy^{10} + AHy^{12} + AIy^{14}$$

where z is the surface sag at a distance y from the optical axis of the system, c is the curvature of the lens at the optical axis, and k is a conic constant.

The abbreviations used in the tables are as follows: SN—surface number; CLR. AP.—clear aperture; FIELD—half field of view; EFL—effective focal length; FVD—front vertex distance; f/—f-number; BFL—back focal length; and BRL—barrel length. The designations "a", "ac", "f", and "m" associated with various surfaces represent "aspheric", "aspheric with a conic constant", "Fresnel", and "mirror", respectively. The first surface in each table is the aperture stop and is not shown in the figures. All dimensions given in the tables are in millimeters.

Figure 2:
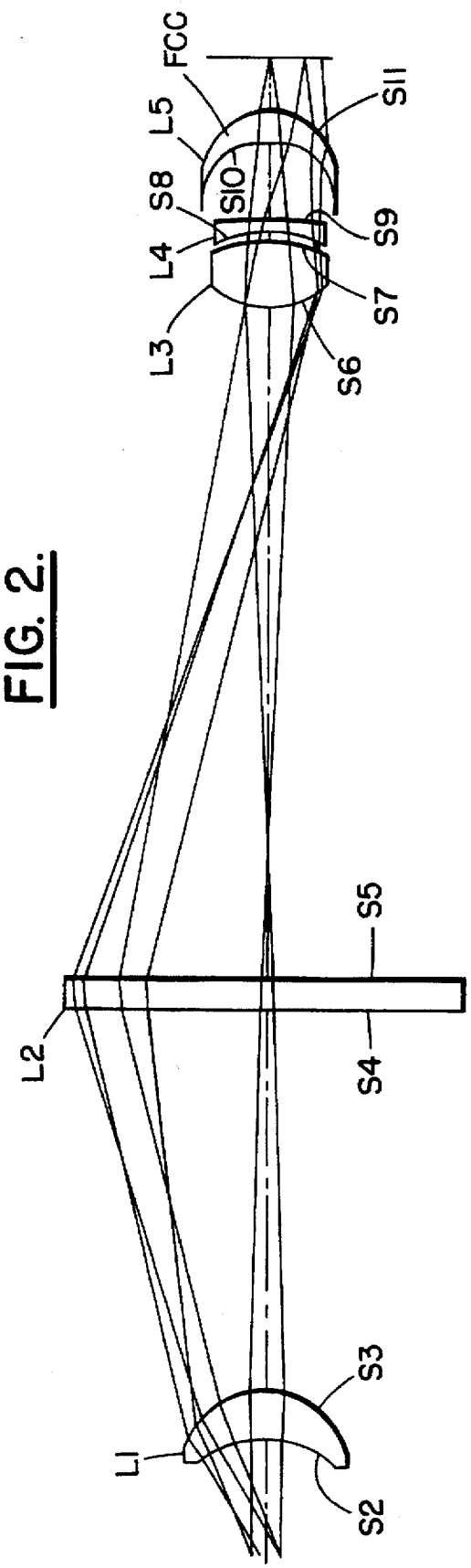

FIGS. 1, 3 and 4 show compounded magnifiers having an objective lens unit (L3, L4, L5), a field lens unit (L2), and an eyepiece lens unit comprising a single element (L1). The objective lens unit includes a FCC (L5) and the L3/L4 combination serves as a color-correcting doublet. FIG. 2 shows a modification of these lens systems in which the field lens unit comprises a Fresnel lens.

Figure 5:
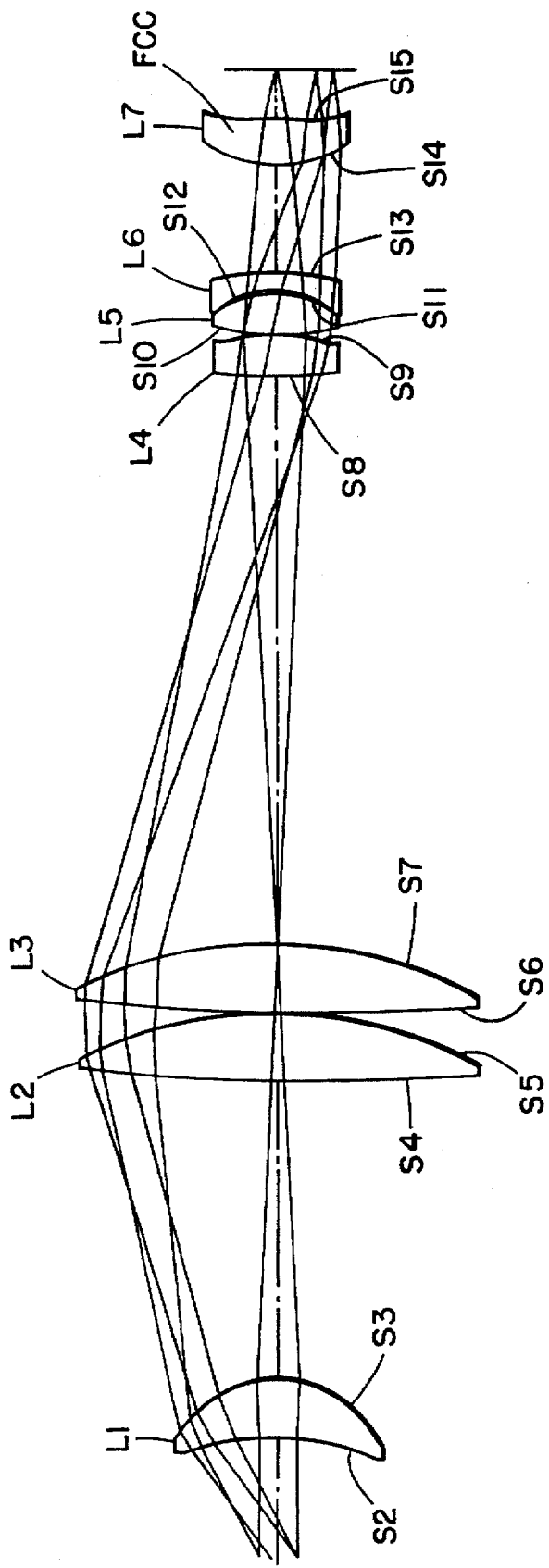

In FIG. 5, the field lens unit comprises two positive lens elements (L2, L3) and the objective lens unit (L4 through L7) includes a positive lens element L4 in addition to color-correcting doublet L5/L6. Again, the eyepiece lens unit comprises a single element (L1). The FCC for this embodiment is L7.

Figure 6:
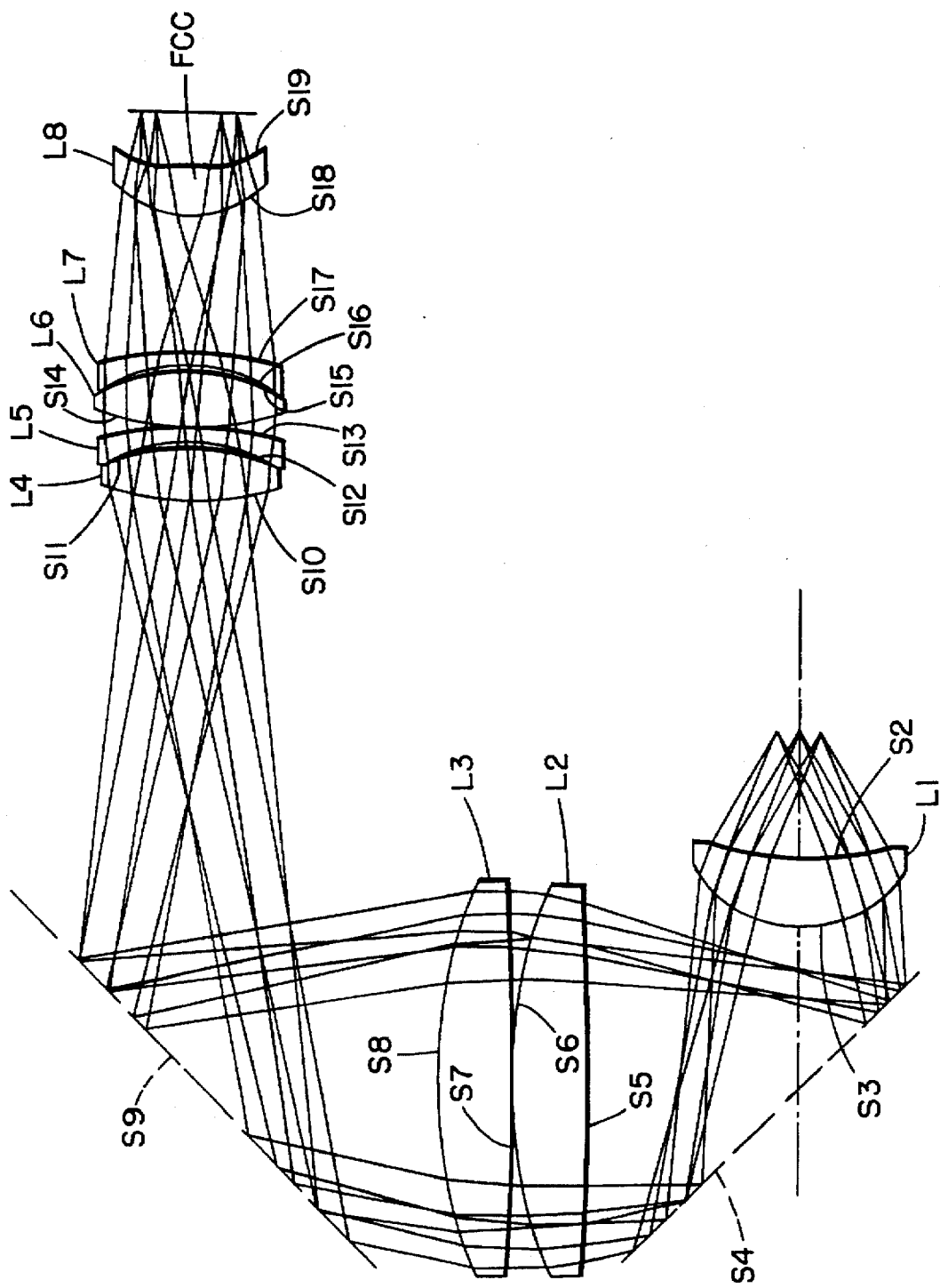

FIG. 6 shows a folded embodiment employing mirrors S4 and S9. The eyepiece lens unit comprises lens element L1, the field lens unit comprises lens elements L2 and L3, and the objective lens unit comprises elements L4 through L8, with L4/L5 and L6/L7 comprising color-correcting doublets, and L8 being the FCC. The magnifier of this figure, as well as that of FIG. 5, has a total field of view of 70° and is corrected for a pupil having a diameter of 6–7 millimeters.

In all of these embodiments, the color-correcting doublets have positive power. Also, the entrance pupil for the objective lens unit lies on the image (long conjugate) side of that unit. Further, the intermediate image for these embodiments is concave to the eyepiece lens.

As can be seen in the figures, the angle of incidence of the principal rays onto the object surface is low, almost telecentric, for all of these embodiments. This is a further advantage of the invention since it provides for efficient collection of light from the luminous points of, for example, a LCD display.

Tables 7–9 summarize various of the properties of the lens systems of FIGS. 1–6.

Table 7 sets forth the $\overline{Y}/Y$ values for the FCC elements of these figures. As shown therein, these values are all above 3.0, as is preferred.

Table 8 sets forth PC and EFC values for the FCC elements. In particular, the EFC values have been determined for the limiting principal ray ($EFC_l$). Since these elements have a positive power, the PC values are all negative; since the elements are functioning as field curvature correctors, the EFC values for all of the field heights shown are positive.

Table 9 sets forth values for the parameters S4X and PTZ3 for the entire system ($S4X_{SYS}$ and $PTZ3_{SYS}$) and for the FCC element ($S4X_{FCC}$ and $PTZ3_{FCC}$) for relative field heights of 0.35, 0.70, 0.85, and 1.00. S4X and PTZ3 are related to EFC and PC as follows:

$$S4X = EFC \cdot INV^2$$

$$PTZ3 = PC \cdot INV^2$$

where INV is the LaGrange invariant given by:

$$INV = (y\bar{u} - \bar{y}u) \cdot n$$

where y is the height of the paraxial marginal ray on the first surface of the lens system, u is the paraxial angle of that ray relative to the optical axis of the system, $\bar{y}$ is the height of the paraxial principal ray at the first surface of the system, $\bar{u}$ is the paraxial angle of the paraxial principal ray incident upon the first surface of the system, and n is the index of refraction.

In the above examples, the first surface of the lens system is the aperture stop, so that $\bar{y}$ is always zero, and n is 1. INV then becomes the product of half of the aperture stop diameter and the angle of the principal ray.

In practice, the S4X and PTZ3 parameters will be more convenient to use in making calculations than the PC and EFC parameters of equations (1) and (2) above. However, because the S4X and PTZ3 parameters are somewhat more complex, the PC and EFC parameters have been used herein for purposes of explanation, it being understood that the claims appended hereto, although expressed in terms of the EFC parameter, are intended to cover embodiments of the invention employing any equivalent parameter.

Table 9 shows that $PTZ3_{FCC}$ is negative for all field heights, while $S4X_{FCC}$ is negative for smaller field heights and becomes positive for larger field heights. It is by means of this change that the FCC achieves its field curvature correcting function. A comparison of $S4X_{SYS}$ and $PTZ3_{SYS}$ shows the same effect. In all cases, the $S4X_{SYS}$ value is more positive than the $PTZ3_{SYS}$ value.

Table 9 also sets forth "A" and "B" values calculated using the following equations:

$$A = (S4X_{FCC} - PTZ3_{FCC})/(S4X_{SYS} - PTZ3_{SYS})$$

$$B = S4X_{FCC} - PTZ3_{FCC}$$

The A values provide a measure of the role which the FCC plays in correcting the field curvature of the lens system, while the B values are indicative of the amount of asphericity in the FCC. As shown in Table 9, over a substantial range of field heights, A should preferably have a value in the range from about +0.4 to about +2.0 and B should preferably be positive.

Although specific embodiments of the invention have been described and illustrated, it is to be understood that a variety of modifications which do not depart from the scope and spirit of the invention will be evident to persons of ordinary skill in the art from the foregoing disclosure. The following claims are intended to cover the specific embodiments set forth herein as well as such modifications, variations, and equivalents.

TABLE 1

| SN. | RADIUS | THICKNESS | GLASS | CLR. AP. |
|---|---|---|---|---|
| 1 | ∞ | 20.00000 | | 5.00 |
| 2 | −22.9729 | 8.00000 | ACRYLIC | 22.13 |
| 3 a | −15.6086 | 53.09448 | | 26.02 |
| 4 | 120.5446 | 15.00000 | ACRYLIC | 58.27 |
| 5 a | −42.4406 | 106.68940 | | 58.33 |
| 6 | 15.2105 | 11.00000 | ACRYLIC | 19.66 |
| 7 ac | −18.5372 | 1.38349 | | 18.38 |
| 8 a | −18.1925 | 2.00000 | STYRENE | 17.05 |
| 9 | −80.3247 | 15.63746 | | 17.03 |
| 10 ac | 66.3315 | 5.00000 | ACRYLIC | 15.76 |
| 11 | −11.3889 | 7.35031 | | 17.83 |

FIELD: 30.0°  f/ 3.00
EFL: −14.9943  BFL: 7.35031
FVD: 245.155  BRL: 237.805
CONICS SURF. CONST.

7  −3.0000E + 00
10  4.9135E + 00

EVEN POLYNOMIAL ASPHERES

| SN | AD | AE | AF | AG | AH | AI |
|---|---|---|---|---|---|---|
| 3 | 1.3560E − 05 | −2.4581E − 07 | 1.6628E − 11 | 2.4275E − 12 | 6.5109E − 15 | −3.4614E − 17 |
| 5 | −1.0887E − 06 | 1.4577E − 10 | 2.6397E − 12 | 2.2942E − 15 | −3.7671E − 18 | 6.4132E − 22 |
| 7 | 8.9328E − 06 | −1.1283E − 07 | 9.5436E − 10 | 1.5455E − 12 | −7.9841E − 14 | −1.9438E − 15 |
| 8 | 2.3290E − 06 | −9.3499E − 07 | 6.8544E − 09 | 8.7586E − 11 | −1.9058E − 13 | −1.3501E − 14 |
| 10 | −8.6303E − 04 | 2.0708E − 06 | 2.9765E − 08 | −5.0935E − 11 | −4.2623E − 12 | −9.3135E − 15 |

TABLE 2

| SN. | RADIUS | THICKNESS | GLASS | CLR. AP. |
|---|---|---|---|---|
| 1 | ∞ | 20.00000 | | 5.00 |
| 2 | −18.1187 | 8.00000 | 491570 | 21.38 |
| 3 a | −14.7612 | 64.32226 | | 25.66 |
| 4 f | 119.2630 | 5.00000 | 491570 | 64.25 |
| 5 af | −40.9946 | 114.33220 | | 65.25 |

TABLE 2-continued

| SN | RADIUS | THICKNESS | GLASS | CLR. AP. |
|---|---|---|---|---|
| 6 | 15.5581 | 11.00000 | 491570 | 18.09 |
| 7 ac | −23.5326 | 1.38349 | | 17.51 |
| 8 a | −24.6896 | 2.00000 | 595308 | 16.76 |
| 9 | −83.0367 | 12.84186 | | 17.23 |
| 10 ac | 258.1861 | 5.00000 | 491570 | 18.20 |
| 11 | −11.3889 | 8.72290 | | 20.35 |

FIELD: 30.0°  f/ 3.00
EFL: −15.0000  BFL: 8.72290
FVD: 252.603  BRL: 243.880
CONICS SURF. CONST.

| 7 | −3.0000E + 00 |
| 10 | 4.9135E + 00 |

EVEN POLYNOMIAL ASPHERES

| SN | AD | AE | AF | AG | AH | AI |
|---|---|---|---|---|---|---|
| 3 | 1.1704E − 05 | −3.6411E − 07 | 1.3398E − 10 | 4.1023E − 12 | 1.1790E − 14 | −4.1968E − 17 |
| 5 | 3.0781E − 07 | 4.4689E − 10 | 2.3489E − 12 | 1.7847E − 15 | −4.0405E − 18 | 1.4447E − 21 |
| 7 | 1.4779E − 05 | −2.0056E − 07 | −4.8487E − 10 | −6.9824E − 12 | −1.0510E − 13 | −8.4476E − 16 |
| 8 | 2.0750E − 06 | −1.2019E − 06 | 4.6685E − 09 | 7.2707E − 11 | −3.4242E − 13 | −1.3501E − 14 |
| 10 | −6.8936E − 04 | 3.8754E − 07 | 1.5668E − 08 | 3.1562E − 10 | −3.0903E − 12 | −9.3135E − 15 |

TABLE 3

| SN. | RADIUS | THICKNESS | GLASS | CLR. AP. |
|---|---|---|---|---|
| 1 | ∞ | 20.00000 | | 5.00 |
| 2 | −32.3020 | 8.00000 | ACRYLIC | 22.97 |
| 3 a | −18.3471 | 54.19995 | | 27.01 |
| 4 | 118.5313 | 19.47312 | ACRYLIC | 62.28 |
| 5 a | −49.4826 | 100.17160 | | 62.96 |
| 6 | 15.9114 | 11.00000 | ACRYLIC | 17.78 |
| 7 ac | −15.4065 | 2.38381 | | 14.59 |
| 8 a | −13.9051 | 2.00000 | STYRENE | 12.27 |
| 9 | −323.8162 | 13.40627 | | 13.04 |
| 10 ac | 26.7236 | 5.00000 | ACRYLIC | 17.45 |
| 11 | −11.2537 | 9.45891 | | 18.58 |

FIELD: 30.0°  f/ 3.00
EFL: −14.9999  BFL: 9.45891
FVD: 245.094  BRL: 235.635
CONICS SURF. CONST.

| 7 | −3.0000E + 00 |
| 10 | 4.9135E + 00 |

EVEN POLYNOMIAL ASPHERES

| SN | AD | AE | AF | AG | AH | AI |
|---|---|---|---|---|---|---|
| 3 | 3.6562E − 05 | −3.6438E − 07 | −3.6062E − 10 | 6.6081E − 12 | 1.7679E − 14 | −1.2069E − 16 |
| 5 | −2.9376E − 06 | 2.4968E − 10 | 2.4270E − 12 | 1.7810E − 15 | −3.8721E − 18 | 1.4407E − 21 |
| 7 | 8.5340E − 05 | −9.5896E − 07 | 1.2808E − 08 | −1.5451E − 10 | −2.6787E − 12 | 5.0190E − 14 |
| 8 | 1.3609E − 04 | −1.1981E − 07 | −3.2628E − 08 | 4.6070E − 11 | 7.3363E − 12 | −6.2999E − 14 |
| 10 | −6.5880E − 04 | 1.6493E − 06 | 1.5797E − 08 | −1.0563E − 10 | −2.9530E − 12 | 1.8482E − 14 |

TABLE 4

| SN. | RADIUS | THICKNESS | GLASS | CLR. AP. |
|---|---|---|---|---|
| 1 | ∞ | 20.00000 | | 5.00 |
| 2 | −71.5278 | 8.00000 | ACRYLIC | 25.24 |
| 3 a | −21.1064 | 56.57085 | | 27.86 |
| 4 | 138.2575 | 15.00000 | ACRYLIC | 55.57 |
| 5 a | −45.8961 | 99.64487 | | 55.97 |

TABLE 4-continued

| | | | | |
|---|---|---|---|---|
| 6 | 16.4768 | 11.00000 | ACRYLIC | 17.16 |
| 7 ac | −12.1404 | 0.20000 | | 16.85 |
| 8 a | −15.1680 | 2.00000 | STYRENE | 16.51 |
| 9 a | 789.5538 | 18.28585 | | 16.56 |
| 10 ac | 33.4153 | 6.00000 | STYRENE | 18.60 |
| 11 | −19.4447 | 8.28784 | | 19.91 |

FIELD: 30.5°  f/ 3.00
EFL: −15.0006  BFL: 8.28784
FVD: 244.989  BRL: 236.702
CONICS SURF. CONST.

| | |
|---|---|
| 7 | −3.0000E + 00 |
| 10 | 4.9135E + 00 |

EVEN POLYNOMIAL ASPHERES

| SN | AD | AE | AF | AG | AH | AI |
|---|---|---|---|---|---|---|
| 3 | 1.0807E − 05 | −2.3962E − 07 | −9.2108E − 10 | 6.7600E − 12 | 1.9246E − 14 | −1.0740E − 16 |
| 5 | −4.6999E − 06 | 5.0834E − 09 | 2.2590E − 12 | −1.9168E − 15 | −6.2665E − 18 | 5.0428E − 21 |
| 7 | −3.5892E − 05 | −8.0915E − 07 | 1.8016E − 08 | 7.6667E − 11 | −1.4630E − 12 | −4.9539E − 15 |
| 8 | 2.9510E − 05 | −5.9812E − 07 | 5.4454E − 09 | 1.1894E − 10 | 1.5439E − 12 | −3.0445E − 14 |
| 9 | −2.6302E − 06 | −6.6902E − 08 | 1.7895E − 09 | −7.8375E − 12 | −3.3252E − 14 | 6.0713E − 15 |
| 10 | −5.1905E − 04 | 2.4229E − 06 | 2.0530E − 08 | −9.5891E − 11 | −3.8615E − 12 | 2.8041E − 14 |

TABLE 5

| SN. | RADIUS | THICKNESS | GLASS | CLR. AP. |
|---|---|---|---|---|
| 1 | ∞ | 19.20000 | | 5.77 |
| 2 | −39.0498 | 9.00000 | ACRYLIC | 26.35 |
| 3 a | −17.9894 | 45.95952 | | 29.64 |
| 4 | 282.1433 | 10.56000 | ACRYLIC | 58.17 |
| 5 ac | −87.4037 | 0.19200 | | 58.99 |
| 6 | 282.1433 | 10.56000 | ACRYLIC | 59.38 |
| 7 ac | −87.4037 | 87.42074 | | 59.29 |
| 8 | 120.0007 | 6.00000 | ACRYLIC | 17.92 |
| 9 a | −24.1565 | 0.17199 | | 17.46 |
| 10 | 42.5859 | 6.00000 | ACRYLIC | 17.42 |
| 11 ac | −16.7302 | 0.50000 | | 17.78 |
| 12 a | −12.6900 | 2.50000 | STYRENE | 17.57 |
| 13 | −51.5704 | 16.33042 | | 18.43 |
| 14 a | 12.3395 | 7.00000 | ACRYLIC | 20.14 |
| 15 ac | −27.4252 | 7.35972 | | 19.12 |

FIELD: 35.0°  f/ 2.20
EFL: −12.6994  BFL: 7.35972
FVD: 228.754  BRL: 221.395
CONICS SURF. CONST.

| | |
|---|---|
| 5 | 3.0000E + 00 |
| 7 | 3.0000E + 00 |
| 11 | −3.0000E + 00 |
| 15 | 4.9135E + 00 |

EVEN POLYNOMIAL ASPHERES

| SN | AD | AE | AF | AG | AH | AI |
|---|---|---|---|---|---|---|
| 3 | 3.5767E − 05 | −3.9810E − 07 | 9.6546E − 11 | 6.5280E − 12 | −1.8338E − 14 | 1.4217E − 17 |
| 5 | −4.0266E − 06 | 3.7251E − 09 | 1.6823E − 12 | −2.7119E − 15 | −1.6179E − 18 | 2.1053E − 21 |
| 7 | −4.0266E − 06 | 3.7251E − 09 | 1.6823E − 12 | −2.7119E − 15 | −1.6179E − 18 | 2.1053E − 21 |
| 9 | 5.1088E − 05 | −2.5708E − 07 | 9.0072E − 10 | −8.1972E − 12 | 1.3515E − 13 | 7.7910E − 15 |
| 11 | −1.1979E − 05 | −3.3923E − 08 | 2.3905E − 08 | −3.3927E − 10 | −7.8411E − 12 | 8.1855E − 14 |
| 12 | 1.6472E − 04 | 4.4818E − 07 | −8.3847E − 09 | 3.6895E − 10 | −1.4279E − 11 | 1.0703E − 13 |
| 14 | −1.8438E − 04 | −9.9513E − 08 | −2.6028E − 09 | −1.0879E − 11 | 9.1252E − 14 | 3.9037E − 16 |
| 15 | 6.3732E − 04 | −4.8046E − 06 | 6.9076E − 09 | 3.2987E − 11 | 3.7699E − 13 | −1.5267E − 16 |

TABLE 6

| SN. | RADIUS | THICKNESS | GLASS | CLR. AP. |
|---|---|---|---|---|
| 1 | ∞ | 19.20000 | | 6.68 |
| 2 | −58.6360 | 10.00000 | ACRYLIC | 27.58 |
| 3 a | −20.9887 | 24.00000 | | 30.88 |
| 4 | ∞ | 32.00000 | m | 80.00 |
| 5 | 675.5401 | 11.00000 | ACRYLIC | 62.12 |
| 6 ac | −82.5756 | 0.19200 | | 63.23 |
| 7 | 675.5401 | 11.00000 | ACRYLIC | 63.73 |
| 8 ac | −82.5756 | 103.52560 | | 63.75 |
| 9 | ∞ | 20.00000 | m | 80.00 |
| 10 a | 44.6622 | 8.00000 | ACRYLIC | 25.13 |
| 11 | −31.0249 | 0.95000 | | 25.47 |
| 12 | −24.3594 | 2.00000 | STYRENE | 25.44 |
| 13 | −54.8983 | 0.20000 | | 26.51 |
| 14 a | 44.6622 | 8.00000 | ACRYLIC | 27.07 |
| 15 | −31.0249 | 0.95000 | | 26.59 |
| 16 | −24.3594 | 2.00000 | STYRENE | 26.60 |
| 17 | −54.8983 | 20.08791 | | 26.88 |
| 18 | 16.0000 | 7.00000 | ACRYLIC | 22.85 |
| 19 ac | −31.1880 | 8.07489 | | 19.95 |

FIELD: 35.0°  f/ 1.90
EFL: −12.6997  BFL: 8.07489
FVD: −27.2548  BRL: −35.3297
CONICS SURF. CONST.

| | |
|---|---|
| 6 | 3.0000E + 00 |
| 8 | 3.0000E + 00 |
| 19 | 4.9135E + 00 |

EVEN POLYNOMIAL ASPHERES

| SN | AD | AE | AF | AG | AH | AI |
|---|---|---|---|---|---|---|
| 3 | 8.5154E − 06 | −3.2100E − 07 | 4.0090E − 10 | 5.4160E − 12 | −2.4404E − 14 | 3.2668E − 17 |
| 6 | −1.2464E − 06 | 1.5319E − 09 | 4.6979E − 13 | −1.0640E − 15 | 4.5548E − 19 | 1.8313E − 23 |
| 8 | −1.2464E − 06 | 1.5319E − 09 | 4.6979E − 13 | −1.0640E − 15 | 4.5548E − 19 | 1.8313E − 23 |
| 10 | 2.0238E − 06 | 2.2361E − 08 | −1.0468E − 10 | 4.7241E − 13 | 2.0573E − 17 | 1.3330E − 19 |
| 14 | 2.0238E − 06 | 2.2361E − 08 | −1.0468E − 10 | 4.7241E − 13 | 2.0573E − 17 | 1.3330E − 19 |
| 19 | 6.2842E − 04 | −2.2704E − 06 | −1.3346E − 08 | 7.3415E − 11 | 1.2138E − 12 | −7.1008E − 15 |

TABLE 7

| | $\bar{Y}/Y$ of FCC Element | |
|---|---|---|
| Ex. No. | Image Side | Object Side |
| 1 | 4.66 | 6.85 |
| 2 | 4.98 | 6.77 |
| 3 | 4.25 | 5.44 |
| 4 | 4.64 | 6.65 |
| 5 | 3.73 | 5.53 |
| 6 | 3.40 | 4.44 |

TABLE 8

| PC and EFC values for FCC Element | | |
|---|---|---|
| Ex. No. | PC × 10$^3$ | EFC$_1$ × 10$^3$ |
| 1 | −34.0 | 27.0 |
| 2 | −30.2 | 15.5 |
| 3 | −41.7 | 31.2 |
| 4 | −30.3 | 9.7 |
| 5 | −38.9 | 0.1 |
| 6 | −31.3 | 10.3 |

TABLE 9

| Ex. No. | Rel. Field | S4X$_{FCC}$ | PTZ3$_{FCC}$ | S4X$_{SYS}$ | PTZ3$_{SYS}$ | B | A |
|---|---|---|---|---|---|---|---|
| 1 | .35 | −.0050 | −.0073 | −.0138 | −.0161 | .0023 | 1.000 |
| | .70 | .0213 | −.0313 | −.0169 | −.0690 | .0526 | 1.010 |
| | .85 | .0391 | −.0483 | −.0096 | −.1066 | .0874 | .900 |
| | 1.00 | .0562 | −.0708 | −.0003 | −.1561 | .1270 | .815 |
| 2 | .35 | −.0043 | −.0065 | −.0129 | −.0150 | .0022 | 1.040 |
| | .70 | .0189 | −.0278 | −.0153 | −.0642 | .0467 | .957 |
| | .85 | .0334 | −.0429 | −.0100 | −.0991 | .0763 | .856 |
| | 1.00 | .0323 | −.0629 | .0034 | −.1451 | .0952 | .532 |
| 3 | .35 | −.0086 | −.0090 | −.0152 | −.0162 | .0004 | .408 |
| | .70 | −.0005 | −.0384 | −.0349 | −.0696 | .0379 | 1.092 |
| | .85 | .0262 | −.0593 | −.0224 | −.1074 | .0855 | 1.010 |
| | 1.00 | .0650 | −.0869 | .0066 | −.1573 | .1520 | .927 |
| 4 | .35 | −.0058 | −.0067 | −.0151 | −.0163 | .0009 | .756 |
| | .70 | .0026 | −.0290 | −.0444 | −.0699 | .0316 | 1.237 |
| | .85 | .0091 | −.0448 | −.0536 | −.1081 | .0539 | .989 |
| | 1.00 | .0210 | −.0658 | −.0445 | −.1587 | .0868 | .760 |
| 5 | .35 | −.0123 | −.0153 | −.0300 | −.0316 | .0030 | 1.875 |
| | .70 | .0142 | −.0672 | −.0717 | −.1391 | .0814 | 1.208 |
| | .85 | .0162 | −.1057 | −.1147 | −.2188 | .1219 | 1.171 |
| | 1.00 | .0006 | −.1586 | −.1814 | −.3285 | .1592 | 1.082 |
| 6 | .35 | −.0108 | −.0164 | −.0327 | −.0365 | .0056 | 1.474 |
| | .70 | .0377 | −.0725 | −.0677 | −.1610 | .1102 | 1.181 |
| | .85 | .0512 | −.1140 | −.1028 | −.2532 | .1652 | 1.098 |
| | 1.00 | .0563 | −.1711 | −.1777 | −.3801 | .2274 | 1.124 |

What is claimed is:

1. A method for producing a lens system, said lens system comprising at least one aspherical surface and optionally comprising one or more spherical surfaces, said method comprising:
   (a) designing the system by a method comprising selecting the shape of one or more aspherical surfaces in the system by determining an EFC value for the system for at least one principal ray, said EFC value given by:

$$EFC = -\Sigma(n'-n)c/nn'$$

where the summation is taken over the surfaces of the system, and for each of said surfaces, n is the index of refraction on the object side of the surface, n' is the index of refraction on the image side of the surface, and c is the curvature of the surface at the intersection of the surface with the principal ray, c being positive if the center of curvature is on the image side of the surface; and
   (b) producing the lens system designed in step (a).

2. The method of claim 1 wherein the system has a maximum field of view and the at least one principal ray is the limiting principal ray associated with said maximum field of view.

3. The method of claim 1 wherein EFC values are determined for multiple principal rays.

4. A method for designing a lens system, said lens system comprising at least one aspherical surface and optionally comprising one or more spherical surfaces, said method comprising:
   (a) selecting the shape of one or more aspherical surfaces in the system by determining an EFC value for the system for at least one principal ray, said EFC value being given by:

$$EFC = -\Sigma Z(n'-n)c/nn'$$

where the summation is taken over the surfaces of the system, and for each of said surfaces, n is the index of refraction on the object side of the surface, n' is the index of refraction on the image side of the surface, and c is the curvature of the surface at the intersection of the surface with the principal ray, c being positive if the center of curvature is on the image side of the surface; and
   (b) displaying a visually-perceivable graphic representation of the lens system designed in step (a).

5. The method of claim 4 wherein the system has a maximum field of view and the at least one principal ray is the limiting principal ray associated with said maximum field of view.

6. The method of claim 4 wherein EFC values are determined for multiple principal rays.

* * * * *